(12) United States Patent
Ho et al.

(10) Patent No.: US 7,746,967 B2
(45) Date of Patent: Jun. 29, 2010

(54) BEAM-FORMER AND COMBINER FOR A MULTIPLE-ANTENNA SYSTEM

(75) Inventors: Minnie Ho, Palo Alto, CA (US); Sumeet Sandhu, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1750 days.

(21) Appl. No.: 10/427,187

(22) Filed: Apr. 30, 2003

(65) Prior Publication Data

US 2004/0219899 A1 Nov. 4, 2004

(51) Int. Cl.
*H04L 1/02* (2006.01)
*H04L 27/08* (2006.01)
*H04B 7/02* (2006.01)

(52) U.S. Cl. ............... 375/347; 375/345; 455/237.1

(58) Field of Classification Search ............ 375/346, 375/347, 348, 349, 316, 219, 267, 299, 345, 375/295, 296; 455/91, 132, 101, 136–139, 455/232.1, 234.1, 237.1, 239.1, 240.1
See application file for complete search history.

(56) References Cited

U.S. PATENT DOCUMENTS

| | | | | |
|---|---|---|---|---|
| 4,313,211 A | * | 1/1982 | Leland | 455/139 |
| 5,877,653 A | * | 3/1999 | Kim et al. | 330/149 |
| 6,091,361 A | * | 7/2000 | Davis et al. | 342/378 |
| 6,549,565 B1 | * | 4/2003 | Buehrer et al. | 375/142 |
| 6,763,062 B1 | * | 7/2004 | Kohno et al. | 375/220 |
| 7,039,363 B1 | * | 5/2006 | Kasapi et al. | 455/67.11 |
| 2002/0013164 A1 | | 1/2002 | Leifer et al. | |
| 2002/0110205 A1 | * | 8/2002 | Piirainen | 375/346 |
| 2003/0048861 A1 | | 3/2003 | Kung et al. | |
| 2004/0002364 A1 | * | 1/2004 | Trikkonen et al. | 455/562.1 |
| 2004/0069059 A1 | * | 4/2004 | Shakespeare | 73/159 |

FOREIGN PATENT DOCUMENTS

EP 0892504 A2 5/1998

* cited by examiner

*Primary Examiner*—Tesfaldet Bocure
(74) *Attorney, Agent, or Firm*—Kacvinsky LLC

(57) ABSTRACT

A compensating correction value for adjusting analog signals received from multiple antenna elements takes into account the effects of colored noise, co-channel interference, and inter-sample interference. The method of generating the compensating correction value for analog combining architectures considers the total channel impulse response over a block of time.

6 Claims, 6 Drawing Sheets

BEAM-FORMER AND COMBINER FOR A MULTIPLE-ANTENNA SYSTEM

Some wireless systems use a single antenna for transmission and reception while some products incorporate multiple antennas, but use the multiple antennas in a very simple way. For instance, some smart-antenna systems incorporate selection diversity, where a switch chooses one of two antennas based on which antenna has a higher received signal power.

For smart-antenna systems there is a continuing need for better ways to control multiple antenna.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
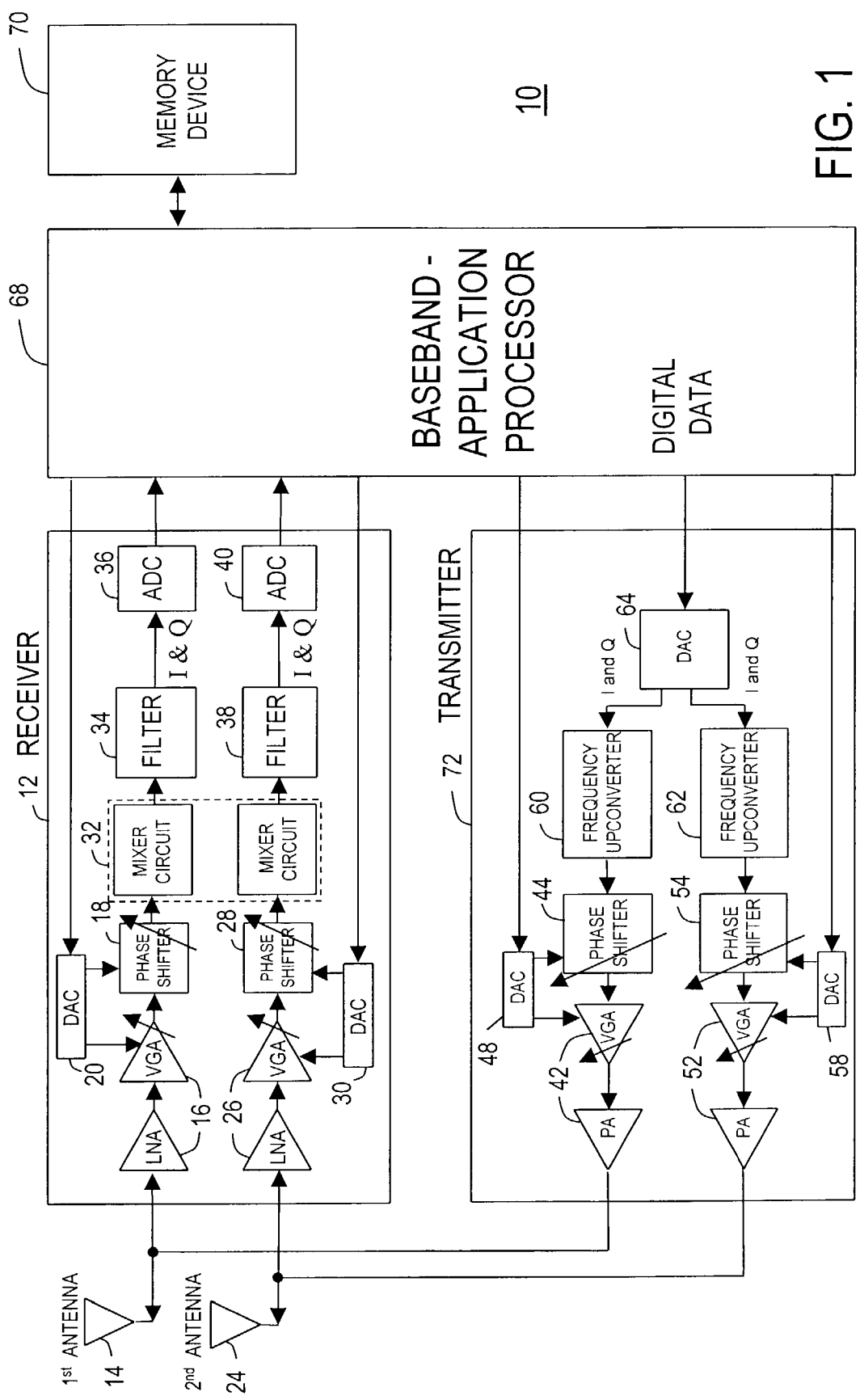
FIG. 1 illustrates features of the present invention for controlling the gain and phase of signals in a receive chain that may be incorporated into a wireless communications device.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 illustrates features of the present invention that may be incorporated into a wireless communications device 10. The transceiver receives and transmits modulated signals from multiple antenna. In a receiver 12, a first receiver chain includes a Low Noise Amplifier (LNA) and Variable Gain Amplifier (VGA) 16 to amplify the received signal from antenna 14 followed by a phase shifter 18. A Digital-To-Analog Converter (DAC) 20 is connected to LNA 16 and phase shifter 18 to adjust the gain and the phase of the received modulated signal. A mixer circuit 32 receives the modulated signals in the first receiver chain and translates the carrier frequency of the modulated signal, down-converting the frequency of the modulated signal in the receiver. The down-converted signal may be filtered through a filter 34 and converted to a digital representation by an Analog-To-Digital Converter (ADC) 36.

Receiver 12 may further include a second receiver chain to receive a signal from antenna 24 that includes a LNA and VGA 26, followed by a phase shifter 28. A DAC 30 is connected to LNA 26 and phase shifter 28 to adjust the gain and the phase of the modulated signal received in the second receiver chain. A mixer circuit 32 receives the modulated signals in the second receiver chain and down-converts the frequency of the modulated signal. The down-converted signal may be filtered through a filter 38 and converted to a digital representation by an ADC 40.

A baseband and application processor 68 is connected to ADCs 36 and 40 to provide, in general, the digital processing of the received data within communications device 10. Note that wireless communications device 10 may operate in a variety of channel conditions where the signals received at the antenna may be corrupted by multiple propagation paths. For instance, pedestrian or vehicular motion induces Doppler frequency shifts on multi-path components, resulting in a time variation of the faded multi-path channel. Thus, a wireless receiver may see multiple signals arriving at the same time, where the signals have been reflected off surfaces and not received in a direct path from the transmitter.

Processor 68 may process the digitized quadrature signals, i.e., the in-phase "I" signal and the quadrature "Q" signal from the first receiver chain, to provide the control signals to DAC 20 to mitigate the effects of channel multi-path in accordance with features of the present invention. Likewise, the digitized quadrature signals from the second receiver chain are processed to provide the control signals to DAC 30 to mitigate the effects of channel multi-path in that channel.

Note that cellular communications systems may also receive signals having interference between adjacent pulses of a transmitted code. The distortion may be manifested in the temporal spreading and consequent overlap of individual pulses causing the receiver difficulty in reliably distinguishing between individual signal elements. Processor 68 may process the digitized quadrature signals from the first and second receiver chains to mitigate the effects of Inter-Symbol Interference (ISI) in accordance with features of the present invention.

The transceiver also includes a transmitter 72 where digital data received from processor 68 may be converted to an analog signal by a Digital-to-Analog Converter (DAC) 64. In a first transmitter path, the analog signal may be modulated by a frequency upconverter 60, with the phase and gain of the modulated signal adjusted by a phase shifter 44 and Variable Gain-Power Amplifier (VGA-PA) 42. A DAC 48 uses control signals from processor 68 to set a phase and signal strength that are appropriate for the modulated signal transmitted from antenna 14. In a second transmitter path, the analog signal may be modulated by a frequency upconverter 62, with the phase and gain of the modulated signal adjusted by a phase shifter 54 and VGA-PA 52. Likewise, a DAC 58 uses control signals from processor 68 to set a phase and signal strength that are appropriate for the modulated signal transmitted from antenna 24.

Receiver 12 and transmitter 72 may be embedded with processor 68 as a mixed-mode integrated circuit, or alternatively, the transceiver may be a stand-alone Radio Frequency (RF) integrated circuit. Accordingly, embodiments of the present invention may be used in a variety of applications, with the claimed subject matter incorporated into microcontrollers, general-purpose microprocessors, Digital Signal Processors (DSPs), Reduced Instruction-Set Computing (RISC), Complex Instruction-Set Computing (CISC), among other electronic components. In particular, the present invention may be used in smart phones, communicators and Personal Digital Assistants (PDAs), medical or biotech equipment, automotive safety and protective equipment, and automotive infotainment products. However, it should be understood that the scope of the present invention is not limited to these examples.

Further, the principles of the present invention may be practiced in wireless devices that are connected in a Code Division Multiple Access (CDMA) cellular network and distributed within an area for providing cell coverage for wireless communication. Additionally, the principles of the present invention may be practiced in Wireless Local Area Network (WLAN), Wide Area Network (WAN), Personal Area Network (PAN) and Local Area Network (LAN), among others.

A memory device 70 may be connected to processor 68 to store data and/or instructions. In some embodiments, memory device 70 may be volatile memories such as, for example, a Static Random Access Memory (SRAM), a Dynamic Random Access Memory (DRAM) or a Synchronous Dynamic Random Access Memory (SDRAM), although the scope of the claimed subject matter is not limited in this respect. In alternate embodiments, the memory devices may be nonvolatile memories such as, for example, an Electrically Programmable Read-Only Memory (EPROM), an Electrically Erasable and Programmable Read Only Memory (EEPROM), a flash memory (NAND or NOR type, including multiple bits per cell), a Ferroelectric Random Access Memory (FRAM), a Polymer Ferroelectric Random Access Memory (PFRAM), a Magnetic Random Access Memory (MRAM), an Ovonics Unified Memory (OUM), a disk memory such as, for example, an electromechanical hard disk, an optical disk, a magnetic disk, or any other device capable of storing instructions and/or data. However, it should be understood that the scope of the present invention is not limited to these examples.

FIGS. 2-6 illustrate flow diagrams for different methods used in computing weights for a multiple-antenna system in accordance with the present invention. The weights may also be referred to as antenna weights and affect the signal gain and signal phase in the receiver chains connected to the various antenna. The weights may be digitally computed by processor 68 for the linear combiner in receiver 12 and the beam-former in transmitter 72. These weights take into account the time-domain signal and the entire channel impulse response and are used by wireless communications device 10 to improve the ratio of average signal power to average noise power. Accordingly, phase shifting and gain amplification may be performed on the multiple receive signals prior to combining, with the weights for the linear combiner supplied to DACs 20 and 30. Additionally, phase shifting and gain amplification may be performed on the multiple transmit signals prior to transmission, with the weights for the beam-former supplied to DACs 48 and 58. Note that the weight precision may be controlled by the number of DAC bits.

Channel estimation may be performed in wireless communications device 10 by averaging over a series of known training or preamble sequences. Known symbols may be sent to receiver 12 to derive a compensating correction value that may be applied to the receiver chain that corresponds to each antenna element. Note that the channel impulse response may be estimated either in the time-domain or in the frequency-domain, where the choice of domain depends on the wireless system being enhanced. By taking into account time-domain transmit or receive signals when computing the weights, these weights may be applied to time-domain, analog signals. In this way, these operations may be performed with analog components and reduce the silicon hardware costs.

Figure 2:
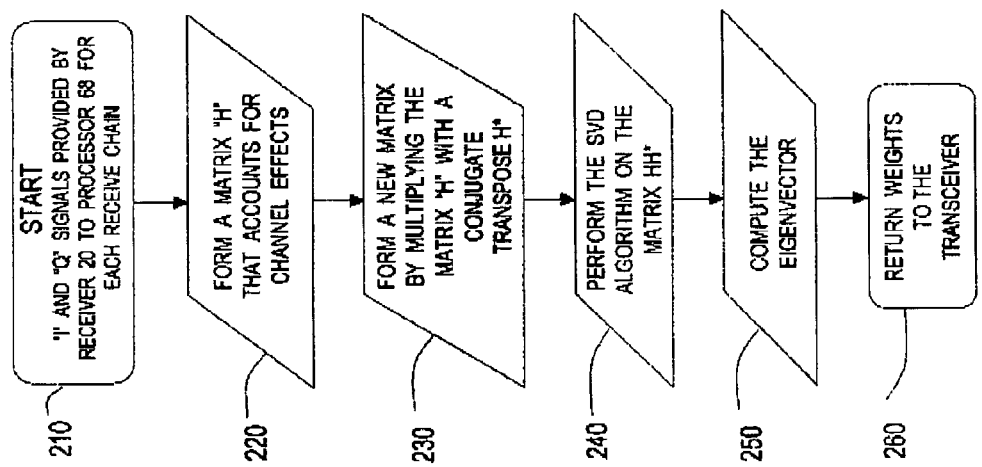
FIG. 2 illustrates a flow diagram for an embodiment that generates a channel matrix H in accordance with the present invention.

Referring specifically to FIG. 2, the effects of the channel on the signals received by antenna 14 and 24 may be estimated, with the digitized quadrature signals supplied to processor 68 for each receive chain (Process 210). The channel matrix is then formed (Process 220), where the rows of the channel matrix H are simply the channel estimates. The length of the channel estimates may be chosen to be the same for all antenna elements, although this is not a limitation of the present invention. Once the channel matrix has been formed, a new matrix H may be computed (Process 230) by multiplying the matrix H with its conjugate transpose H*, this mathematical operation being denoted as H=HH*. The Singular Value Decomposition (SVD) algorithm may then be performed on this matrix (Process 240), and the eigenvector corresponding to the maximum singular vector may be computed (Process 250). These weights may be shown to be optimal in terms of maximizing the signal-to-noise power ratio for multiple analog signals. These weights computed by processor 68 may be transferred to receiver 12 and used to control DACs 20 and 30 (Process 260).

The transmit beam-former weights used in transmitter 72 may be computed in the same fashion. In fact, the channel matrix may be the same in both the transmit and receive directions, and in this case, the same weights may be applied at both transmitter 72 and receiver 12. These weights may be used to control DACs 48 and 58 in transmitter 72 to improve the signal-to-noise power ratio at the receiver.

Figure 3:
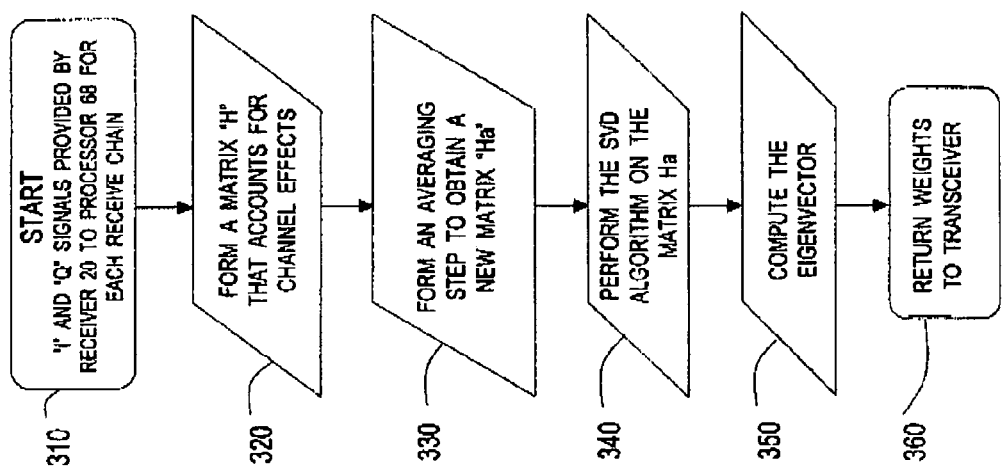
FIG. 3 illustrates a flow diagram for an embodiment that includes an averaging step after the formation of the channel matrix H in accordance with the present invention.

Referring to FIG. 3, the channel associated with each of the multiple-antenna may be estimated and a compensating correction value derived. The digitized quadrature signals for each receive chain may be supplied by receiver 12 to processor 68 (Process 310). The weights may be computed in an average sense by adding an averaging step after the formation of the matrix H (Process 320). In this embodiment, the matrix H may be averaged over a number of channels to obtain a new average matrix "Ha" (Process 330). This channel covariance matrix Ha may then used for SVD computation (Process 340) and weight extraction (Process 350). These weights computed by processor 68 may be transferred to receiver 12 and used to control DACs 20 and 30 (Process 360). This scheme may be used when the exact channel is not known but the channel covariance is known.

Figure 4:
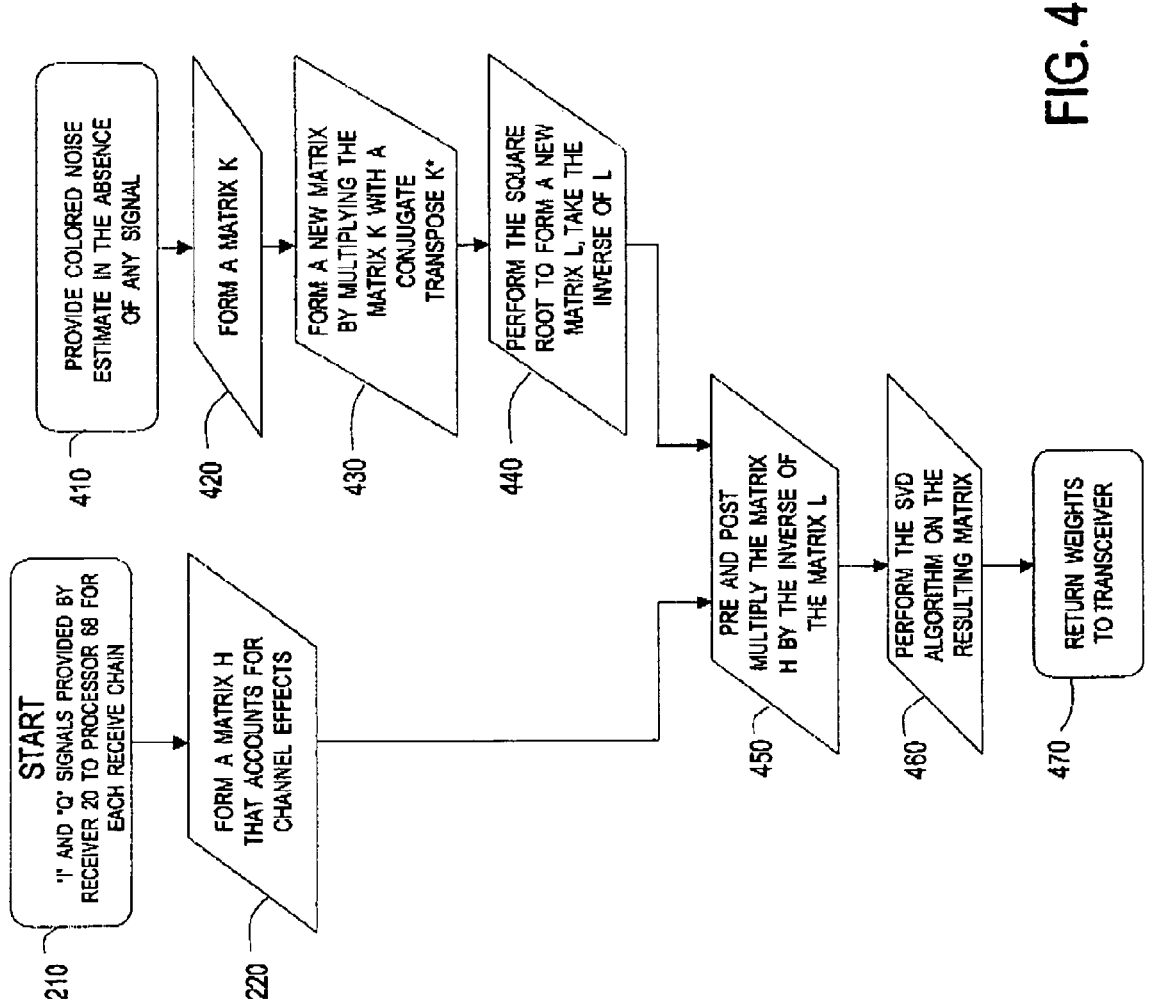
FIG. 4 illustrates a flow diagram for an embodiment that accounts for colored noise in accordance with the present invention.

Referring to FIG. 4, the weights to compensate for the channel may be computed in the presence of colored noise by adding a chain of steps, where the colored noise is estimated in the absence of any signal (Process 410). A noise matrix K may be formed (Process 420), and a new matrix may be computed by multiplying the matrix K with a conjugate transpose K* (Process 430). The square root of the new matrix may then be computed and denoted by the matrix I, with the inverse of matrix L then computed (Process 440). In the original sequence of steps (Process 210, 220), a step may be added after the formation of the matrix H, where the matrix H is pre and post-multiplied by the inverse of the matrix L (Process 450). The weights may then be computed using the SVD algorithm (Process 460), just as in the non-colored noise case. These weights computed by processor 68 may be transferred to receiver 12 and used to control DACs 20 and 30 (Process 470).

Figure 5:
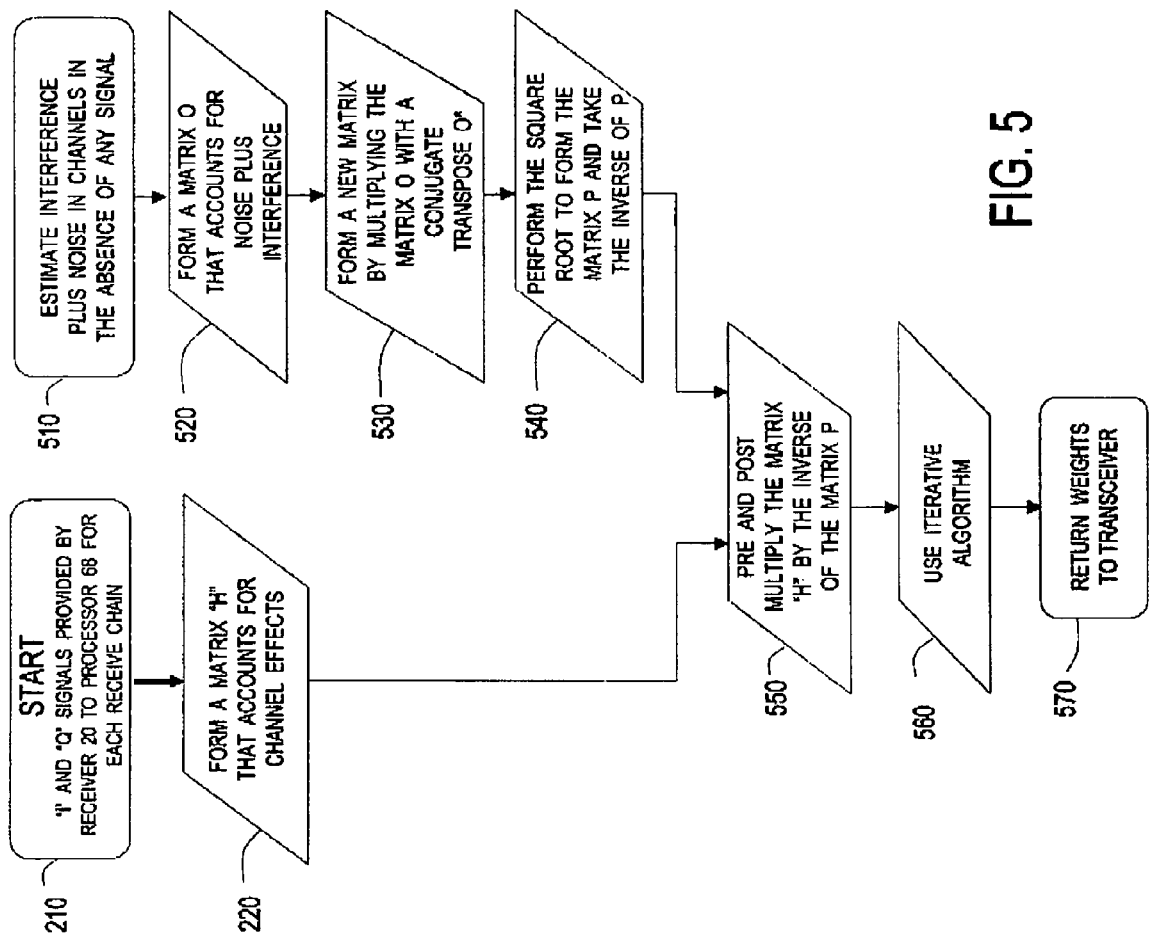
FIG. 5 illustrates a flow diagram for an embodiment that reduces co-channel interference in accordance with the present invention.

Referring to FIG. 5, the weights used to control DACs 20 and 30 may be computed to reduce the presence of co-channel interference and/or co-channel users. The interference plus noise is estimated in the absence of any signal (Process 510) and a noise plus interference matrix O is formed that accounts for the noise and interference (Process 520). Many similarities exist between FIGS. 4 and 5. However, this matrix reduces to a special case of colored noise where the interference plus noise is treated as colored noise. Note that the SVD algorithm is not needed and that sub-optimal iterative algorithms, such as the iterative power method that only compute the optimal eigenvector may be used to reduce digital complexity and computation time (Process 560). Note that the SVD algorithm may be replaced using matrix inverses. These weights computed by processor 68 may be transferred to receiver 12 and used to control DACs 20 and 30 (Process 570).

Figure 6:
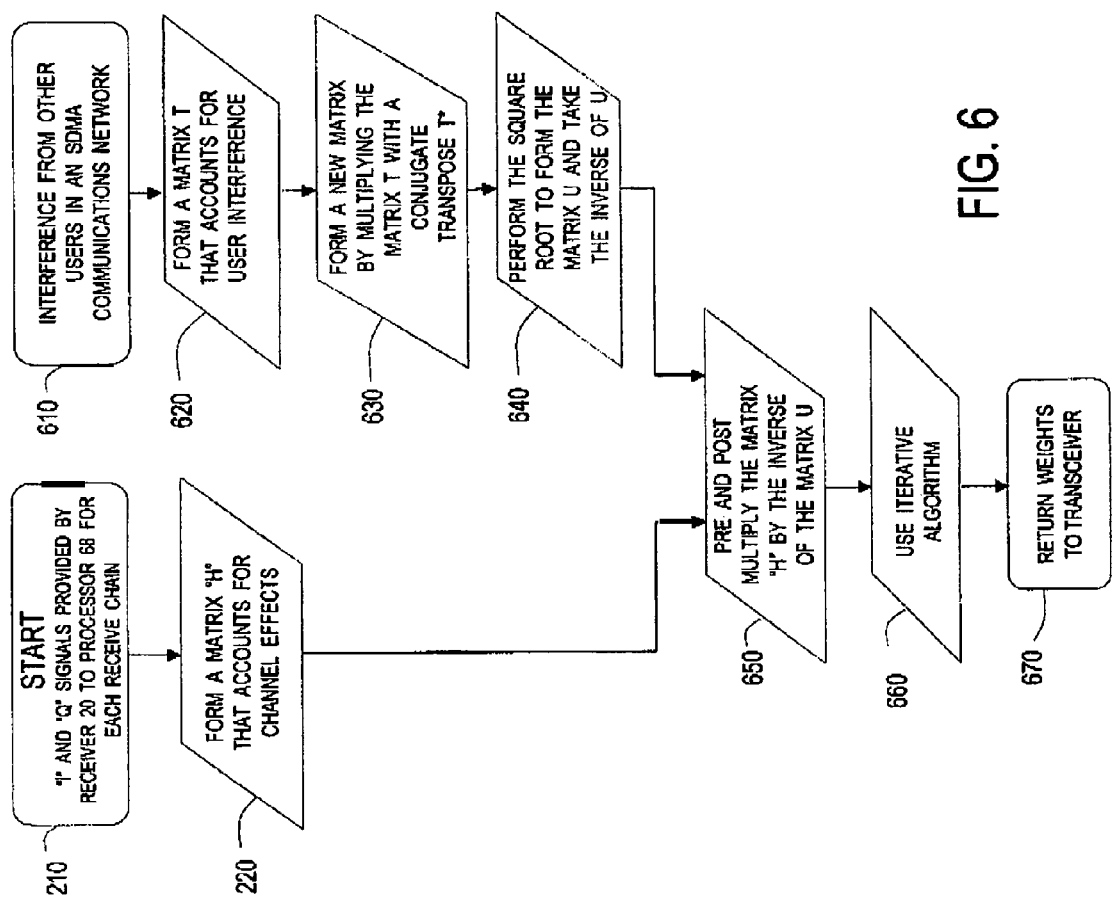
FIG. 6 illustrates a flow diagram for an embodiment using Spatial Division Multiple Access (SDMA) that incorporates analog combining in accordance with the present invention.

FIG. 6 illustrates a flow diagram for an embodiment using Spatial Division Multiple Access (SDMA) that incorporates analog combining in accordance with the present invention. SDMA is a communications mode that optimizes the use of radio spectrum and uses directional properties of antennas. In SDMA, also known as Spatial-Division Multiplex (SDM), highly directional antennas transmit signals, allowing duplicate frequencies to be used.

The weights or the compensating correction value used to control DACs 20 and 30 (FIG. 1) may be computed to reduce the presence of user interference in a SDMA network. The user interference as measured in the quadrature signals (Process 510) is used to form a matrix T (Process 620). A new matrix is formed by multiplying the matrix T with the conjugate transpose T* (Process 630). The square root is taken and the matrix U is formed, then the inverse of the matrix U is taken (Process 640). Process 650 defines a pre and post multiplying of the matrix H by the inverse of the matrix U. These weights computed by processor 68 may be transferred to receiver 12 and transmitter 72 to control DACs 20 and 30 (Process 670).

In general, all of these embodiments described in FIGS. 2-6 that generate receiver weights may also apply to the computation of the transmitter weights. Note that the weights that control the gain and phase of each receive chain may be a function of time and may be adaptively updated with each new channel estimate. Alternatively, for systems where the channel may vary slowly with time, weights for each new channel matrix do not have to be computed from scratch. Rather, the previous weight may be adjusted using an adaptive filter. By way of example, a Recursive Least Squares (RLS) filter (not shown) may simplify the digital SVD algorithm and reduce the length of computing time that is necessary to update the weights. Further, the compensating correction value may be based on the Minimum Mean-Squared Error (MMSE) algorithm (process 660).

It should be noted that the antenna weights may be complex, purely real, or purely imaginary. The weights are complex numbers as computed by processor 68 in the digital baseband domain. The complex weights take into account the entire impulse response of the channel, and thereby, combine and compensate for channel multi-path. In order to reduce implementation complexity and cost, purely real weights may be used with some loss in performance (the optimal real weights are the real part of the optimal complex weights). The weights may be implemented as tapped-delay line filters, Where the number of taps on each antenna may be one or more. The complex weights on all taps and antennas may be controlled digitally. The number of taps on each antenna may be increased to allow better equalization of the temporal signal in the presence of Intersymbol Interference (ISI).

By now it should be clear that the present invention provides weights that take into account the effects of colored noise, co-channel interference, and inter-sample interference. The described method of weight computation for analog combining architectures considers the total channel impulse response over a block of time. Furthermore, these weights may also be computed to take into consideration co-channel interference or co-channel users in the same frequency band. By incorporating multiple antenna, variable-gain amplifiers, phase-shifters and an RF combiner at the receiver, the present invention provides significant gains in performance. The present invention also provides a low cost solution and reduced power consumption when compared to fully digital systems with multiple antenna.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A system comprising:
  a Static Random Access Memory (SRAM);
  a communication processor coupled via an external bus to the SRAM, where the communication processor receives modulated signals at multiple antenna and computes a compensating correction value for analog signals from multiple antenna elements, wherein the compensating correction value is derived from known symbols sent over a network to the receiver that corresponds to each antenna element;
  an amplifier circuit coupled to a phase shifter to receive the modulated signals; and
  a Digital-To-Analog Converter (DAC) coupled to the communication processor to receive the compensating correction value and adjust a gain of the amplifier circuit and a phase in the phase shifter of the received modulated signals.

2. The system of claim 1, wherein the compensating correction value is determined for a channel in the time-domain or in the frequency-domain as selected by the system.

3. The system of claim 1, wherein the communication processor processes quadrature signals from a receiver chain to provide the compensating correction value to the DAC to mitigate effects of channel multi-path.

4. The system of claim 1, wherein the communication processor processes quadrature signals from first and second receiver chains to mitigate effects of Inter-Symbol Interference (ISI).

5. The system of claim 1, wherein the communication processor processes quadrature signals for a linear combiner in a receiver and a beamformer in a transmitter.

6. The system of claim 5, further including:
  a transmitter having an amplifier and a power amplifier; and
  a DAC coupled to the amplifier and the power amplifier to phase shift and amplify signals prior to transmission using the compensating correction value for the beamformer.

* * * * *